(No Model.)

E. E. BEAN.
MANUFACTURE OF CUTTING WHEELS FOR SOLE EDGE TRIMMERS.

No. 409,598. Patented Aug. 20, 1889.

WITNESSES.
Frank G. Parker.
Matthew M. Blunt.

INVENTOR.
Edwin E. Bean ns># UNITED STATES PATENT OFFICE.

EDWIN E. BEAN, OF BOSTON, MASSACHUSETTS.

MANUFACTURE OF CUTTING-WHEELS FOR SOLE-EDGE TRIMMERS.

SPECIFICATION forming part of Letters Patent No. 409,598, dated August 20, 1889.

Application filed December 31, 1888. Serial No. 295,252. (No model.)

*To all whom it may concern:*

Be it known that I, EDWIN E. BEAN, of Boston, in the county of Suffolk and State of Massachusetts, have invented certain new and useful Improvements in the Method of Constructing Cutting-Wheels for Sole-Edge Trimmers, of which the following, taken in connection with the accompanying drawings, is a specification.

The object of my invention is to so improve the method of constructing cutting-wheels for sole-edge-trimming machines that they will be more durable, better working, and cheaper to make. This object I attain by the mechanism shown in the accompanying drawings, in which—

Figure 1:
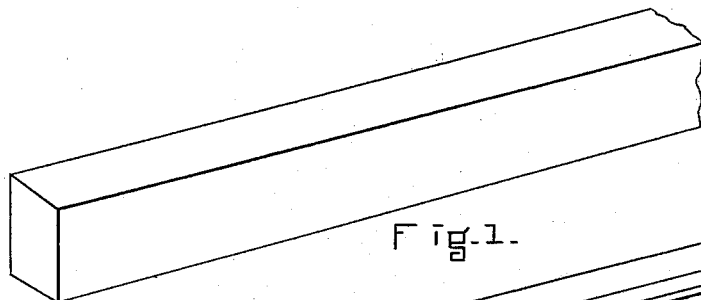
Figure 2:
Figure 3:
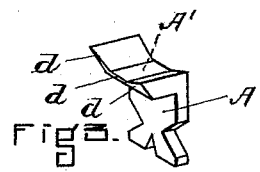
Figure 5:
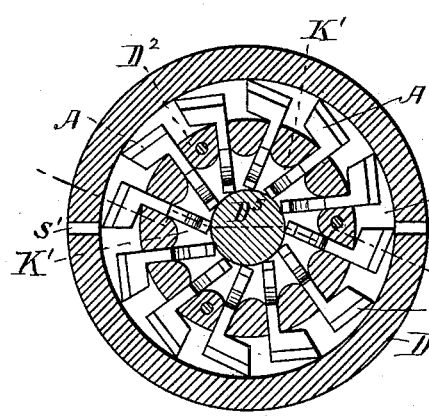
Figure 4:
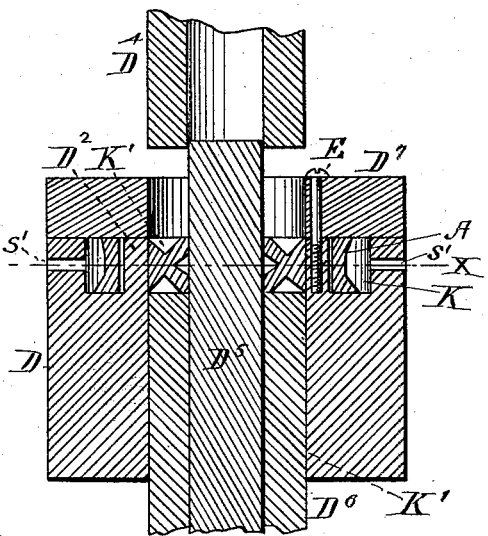
Figure 6:
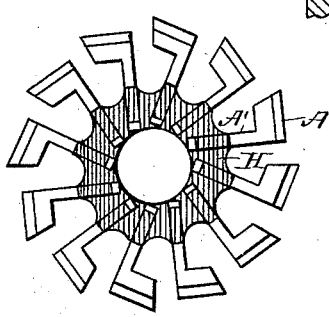

Figure 1 is a perspective view showing a bar of steel, the cross-section of which is of the approximate form of the general outline of the cutters to be made from it. Fig. 2 is a view in perspective of the bar after it has been shaped to agree in cross-section with the section of a cutter. The bar in this form is ready to have cut from it single cutters of the form shown in Fig. 3. Fig. 3 is a view in perspective of one of my cutters or knives proper. Fig. 4 is a vertical section of a mold adapted to hold a series of cutters in exact position and to receive the metal in a melted condition that is used for the purpose of holding the series of cutters in place, and which, together with the series of cutters, constitutes the cutting-wheel. Fig. 5 is a horizontal section taken on line $x\ x$ of Fig. 4. Fig. 6 shows in elevation one of my cutting-wheels complete.

My method of construction is as follows: A bar of steel, as shown in Fig. 1, is shaped by drawing, planing, or milling, so that its cross-section shall be of the form of the outline of the cutter, as shown in Fig. 2. The cutter proper is then made by cutting out from the end of the bar a part, as indicated by the dotted lines $a\ a\ a$, Fig. 2, and then cutting off a part, as indicated by the dotted lines $c\ c\ c$ of Fig. 2, thus producing a cutter proper, as shown in Fig. 3, having a shank A and a blade A'. The cutting-edge $d\ d\ d$ of the blade A' may be made of any desired shape to suit the style of work to which it is to be applied.

The cutter proper is finished, sharpened, and tempered in the usual manner, and is ready to be placed in the mold and incorporated into the complete cutting-wheel.

My method of uniting the several cutters to form a cutting-wheel consists in placing the several cutters in a mold, as shown in Figs. 5 and 6, and in pouring into the mold a metal of comparatively-low fusibility—like lead, Babbitt, or type metal, for instance—that shall run in between and around the shanks of the cutters, and thus unite them so as to form a cutting-wheel, as shown in Fig. 6. To render the binding metal more compact, and also to insure its entrance into all of the interstices in and about the shanks of the cutter, I subject the joining metal to pressure before the wheel is taken from the mold.

In Figs. 4 and 5 I have shown a form of mold for use in making my cutting-wheels.

D, Figs. 4 and 5, represents a cylinder of metal, in which an annular recess K is formed and through the center of which a cylindrical chamber K' is made. The chamber K' is provided with two closely-fitting hollow plungers $D^4$ and $D^6$. The ring $D^2$ between the annular recess K and the central opening is slotted to admit of placing the cutters A A in place, as shown in Fig. 5.

$D^5$ is a round smooth mandrel, which serves as a center for the mold, and also as a guide for the parts $D^6$ and $D^4$.

$D^7$ is an annular disk that forms a top for the mold. The part $D^7$ is held in place by screws, one of which is shown at E, Fig. 4.

To keep the cutters A cool while in the hot metal during the process of molding, I have in the annular recess K a current of water flowing, the supply being maintained through the passages S' S'.

To use the mold I proceed as follows: The cutters A are placed as shown in Figs. 4 and 5, the cap-piece $D^7$ fastened down, and the lower plunger $D^6$ and mandrel $D^5$ inserted, and a current of water started in the chamber S. Now, the plunger $D^4$ being drawn out, as shown in Fig. 4, sufficient metal is poured in to fill the interstices in and about the shanks of the cutters. Then the plunger $D^4$ is brought down with sufficient force to compel the pliant metal to closely and compactly form about the shanks of the cutters, and the completed cutting-wheel, as shown at Fig. 6, may be removed from the mold. The molded metal forms a central part of hub H.

I do not claim the cutting-wheel in this application, as I propose to make that and the mold itself subjects for subsequent applications.

I claim—

The method of making cutting-wheels, consisting of the following steps: first, forming a steel bar, as shown in Fig. 2; second, milling and cutting it into cutters A A'; third, embodying the cutters in a molded hub H, and, fourth, compressing the molded hub, all substantially as described, and for the purpose set forth.

EDWIN E. BEAN.

Witnesses:
 FRANK G. PARKER,
 MATTHEW M. BLUNT.